J. J. IRVIN.
UNIVERSAL LINK CHAIN.
APPLICATION FILED FEB. 15, 1913.
1,105,518. Patented July 28, 1914.
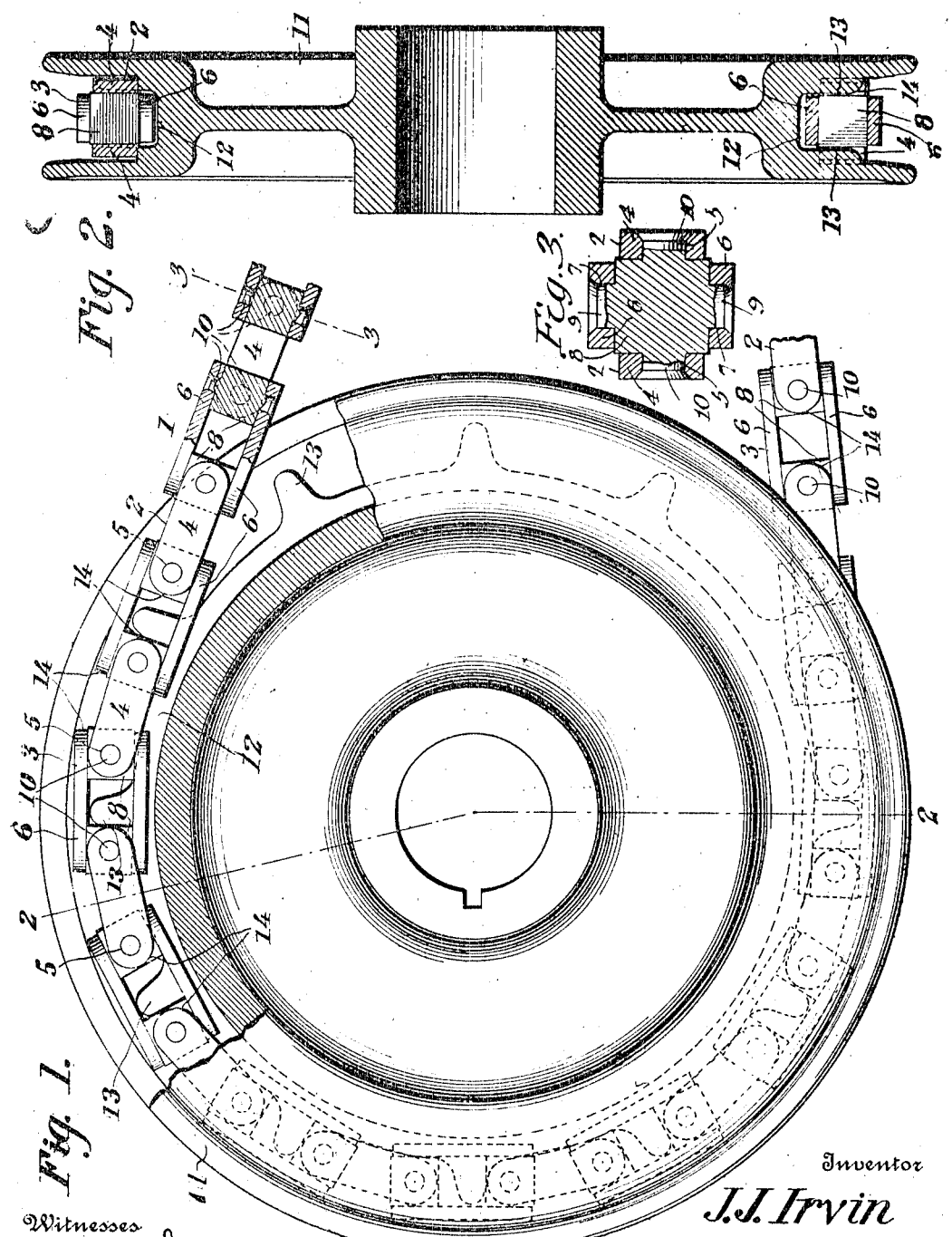
Witnesses
M. F. Garnett
C. A. Hines
Inventor
J. J. Irvin
By Victor J. Evans
Attorney

UNITED STATES PATENT OFFICE.

JOHN J. IRVIN, OF BELLWOOD, PENNSYLVANIA.

UNIVERSAL-LINK CHAIN.

1,105,518.

Specification of Letters Patent.

Patented July 28, 1914.

Application filed February 15, 1913. Serial No. 748,638.

*To all whom it may concern:*

Be it known that I, JOHN J. IRVIN, a citizen of the United States, residing at Bellwood, in the county of Blair and State of Pennsylvania, have invented new and useful Improvements in Universal-Link Chains, of which the following is a specification.

This improvement relates to power transmission chains, and consists in a flexible construction whereby a steam shovel or other traveling conveyance may be propelled around sharp curves without undue wear on the parts or liability to breakage from lateral stress. The chains now in common use for this purpose are either the ordinary straight link cable chain or the side link chain. The cable chain admits of the conveyance being propelled around sharp curves but the bearing contact with its sprocket is so small that the life of the sprocket is very short; it has also the disadvantage of stretching to such an extent that the pitch is soon changed sufficiently to make it inoperative. The side link sprocket as commonly made while having a good bearing surface with the sprocket has no flexibility laterally, with the result that when the machine is being propelled around a sharp curve the chain either breaks or jumps out of its sprocket.

My improved chain combines the advantages of both the cable and side link chain without the objectionable features of either.

The invention is fully set forth in the following description and shown in the accompanying drawings, in which:—

Figure 1 is a side elevation of a sprocket wheel and a section of my improved link chain, a portion of the sprocket wheel being broken away. Fig. 2 is a vertical transverse section on line 2—2 of Fig. 1. Fig. 3 is a vertical transverse section on the line 3—3 of Fig. 1.

Referring to the drawings, 1 designates my improved link chain, which is made up of alternately arranged links 2 and 3. Each link 2 consists of a pair of opposed link plates 4 having countersunk end openings 5. Each link 3 similarly consists of a pair of opposed plates 6 having countersunk end openings 7. The plates of the links are coupled at their proximate ends by fulcrum blocks 8, preferably of cubical form. Each of these blocks is provided with pairs of vertical horizontal pintles 9 and 10, to which the ends of the coacting sets of link plates are pivotally connected. In the example shown, the pintles 9 and 10 are respectively fitted within the openings 5 and 7 and are headed in the countersunk portions thereof to hold the plates from relative displacement.

It will be apparent that by the construction described the sets of chain links are coupled for free relative universal motion in planes at right angles to each other, so that the chain has ample flexibility to travel vertically or laterally around sharp curves without breaking. It will also be seen that the sets of plates are adapted to have a wide range of pivotal movement without interfering with each other, and that the cubical blocks form square abutments which stay the links in an effective manner.

The chain is adapted for transmitting power to either horizontal or vertical sprocket wheels. In Fig. 1 and 2 I have shown a sprocket wheel 11 having a grooved bearing surface 12, at the opposite sides of which are lugs or teeth 13. As shown, each set of link plates is provided with rounded end portions 14 to engage said lugs or teeth, and each link is formed to snugly fit within the bearing surface 12. When the sprocket wheel is vertical the bottom horizontal link plates form bearing surfaces which rest upon the surface 21 and give adequate support to the chain, while the forward ends of the vertical link plates act as abutment surfaces to engage the lugs 13. When the sprocket wheel is horizontal, the adjacent vertical link plates act as bearing surfaces for the chain, while the forward ends of the horizontal plates act as abutment surfaces to engage the lugs or teeth. The chain, while simple of construction, is thus adapted to transmit power to both vertical and horizontal sprockets and travel freely in an irregular path and flex vertically, horizontally and at intermediate angles without binding or breaking.

I claim:—

The combination of a sprocket wheel having a groove or channel in the periphery thereof, said groove or channel forming side plates or flanges, an annular recess in the base of the grooved periphery of less width than the groove, forming annular bearing shoulders within the groove on opposite sides of the recess, and spaced series of transversely registering lugs projecting radially from said shoulders, and a chain comprising sets of links composed of opposed pairs of plates and fulcrum blocks to which said plates are pivotally coupled for universal motion, said opposing sets of plates being respectively arranged at right angles to each other and in planes respectively parallel with and at right angles to the plane of rotation of the wheel, the innermost plates of one set being arranged to travel within the recess and the opposed plates of the other set being arranged to travel upon said bearing shoulders and presenting end abutment surfaces to engage said radial lugs.

In testimony whereof I affix my signature in presence of two witnesses.

JOHN J. IRVIN.

Witnesses:
 CLARENCE J. BURNS,
 EDGAR M. MYERS.